US008719563B2

(12) United States Patent
Kojima et al.

(10) Patent No.: US 8,719,563 B2
(45) Date of Patent: May 6, 2014

(54) KEY SETTING METHOD, NODE, AND NETWORK SYSTEM

(71) Applicant: Fujitsu Limited, Kawasaki (JP)

(72) Inventors: Hisashi Kojima, Yokosuka (JP); Kazuyoshi Furukawa, Kawasaki (JP); Masahiko Takenaka, Kawasaki (JP); Tetsuya Izu, Ichikawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/749,130

(22) Filed: Jan. 24, 2013

(65) Prior Publication Data

US 2013/0138950 A1    May 30, 2013

Related U.S. Application Data

(63) Continuation of application No. PCT/JP2010/062712, filed on Jul. 28, 2010.

(51) Int. Cl.
*H04L 29/06* (2006.01)

(52) U.S. Cl.
USPC .......................................... 713/153; 713/171

(58) Field of Classification Search
USPC ................. 713/153, 160, 168, 171; 726/3, 12; 380/44, 247, 255
See application file for complete search history.

(56) References Cited

U.S. PATENT DOCUMENTS

| | | | | |
|---|---|---|---|---|
| 7,714,735 B2 * | 5/2010 | Rockwell | ...................... | 340/635 |
| 8,138,934 B2 * | 3/2012 | Veillette et al. | ............... | 340/635 |
| 8,144,596 B2 * | 3/2012 | Veillette | ......................... | 370/238 |
| 8,397,288 B2 * | 3/2013 | Melvin et al. | .................... | 726/15 |
| 2005/0144437 A1 * | 6/2005 | Ransom et al. | ............... | 713/151 |
| 2007/0064950 A1 | 3/2007 | Suzuki et al. | | |
| 2010/0317420 A1 * | 12/2010 | Hoffberg | .......................... | 463/1 |
| 2011/0176681 A1 * | 7/2011 | Yamada et al. | ............... | 380/281 |
| 2012/0054852 A1 * | 3/2012 | Gibbs et al. | ..................... | 726/15 |

FOREIGN PATENT DOCUMENTS

| | | |
|---|---|---|
| JP | 2005-303449 | 10/2005 |
| JP | 2006-135874 | 5/2006 |
| JP | 2007-13386 | 1/2007 |
| JP | 2007-88799 | 4/2007 |
| WO | WO 2010/044292 | 4/2010 |

OTHER PUBLICATIONS

International Search Report PCT/JP2010/062712 mailed Oct. 26, 2010.

* cited by examiner

*Primary Examiner* — Samson Lemma
(74) *Attorney, Agent, or Firm* — Staas & Halsey LLP

(57) ABSTRACT

A key setting method executed by a node transmitting and receiving data through multi-hop communication in an ad-hoc network among multiple ad-hoc networks, includes detecting connection with a mobile terminal communicating with a server connected to a gateway in each ad-hoc network among the ad-hoc networks; transmitting by simultaneously reporting to the ad-hoc network, an acquisition request for a key for encrypting the data when the connection with the mobile terminal is detected at the detecting; receiving from the server via the mobile terminal, a key specific to a gateway and transmitted from the gateway to the server consequent to transfer of the simultaneously reported acquisition request to the gateway in the ad-hoc network; and setting the key specific to the gateway received at the receiving as the key for encrypting the data.

12 Claims, 15 Drawing Sheets

| COMMAND | USER ID |
|---|---|
| search gw | D1 |

FIG.8

| HEADER PORTION 810 | | | | | PAYLOAD PORTION 820 | |
|---|---|---|---|---|---|---|
| DESTINATION ADDRESS | SENDER ADDRESS | TYPE | SIZE | HOP NUMBER | USER ID | NODE ID |
| FF:FF:FF:FF:FF:FF | 00:00:00:AA:BB:02 | 2 | 136 | 10 | D1 | N1-x |

800

| USER ID | NODE ID | GATEWAY ID | ENCRYPTION KEY |
|---------|---------|------------|----------------|
| D1 | N1-x | G1 | K1 |

1100

| USER ID | NODE ID | GATEWAY ID |
|---------|---------|------------|
| D1 | N1-x | G1 |

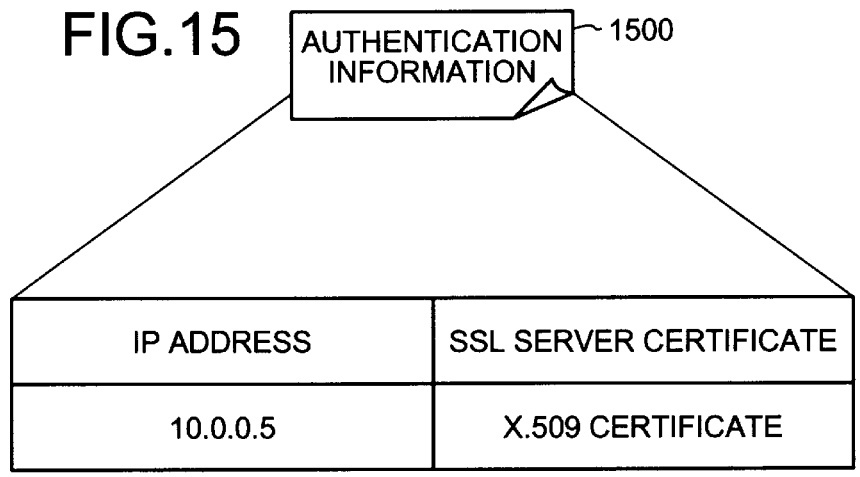
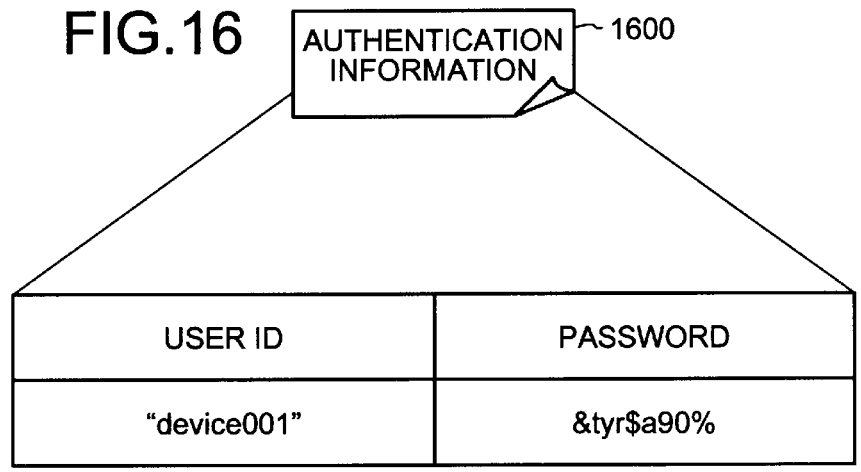

KEY SETTING METHOD, NODE, AND NETWORK SYSTEM

CROSS REFERENCE TO RELATED APPLICATIONS

This application is a continuation application of International Application PCT/JP2010/062712, filed on Jul. 28, 2010 and designating the U.S., the entire contents of which are incorporated herein by reference.

FIELD

The embodiment discussed herein is related to a key setting method, a node, and a network system that set a key for encrypting data.

BACKGROUND

An ad-hoc network is a kind of a self-configuring network linked through radio communication. The ad-hoc network is made up of multiple nodes. The nodes in the ad-hoc network transmit and receive packets through multi-hop communication. Multi-hop communication is a technique enabling nodes that not present in one another's communication area to communicate, via other nodes present in the communication areas of the nodes.

If an ad-hoc network is connected to another network such as the Internet, a local area network (LAN), and a wide area network (WAN), a relay device called gateway is used to transfer communication between networks.

Technology utilizing an ad-hoc network includes a system that incorporates a node capable of radio communication with an electricity meter at a household to perform operations such as checking the meter through the ad-hoc network without actually going to the site. An ad-hoc network handling personal information such as electricity usage of each household is required to perform secure communication with respect to confidentiality and tampering prevention.

Therefore, conventional systems encrypt packets transmitted and received between nodes in an ad-hoc network to ensure secure communication. In this case, use of an encryption key common to all the nodes in the system poses a greater risk if the key is compromised and therefore, some systems change the encryption key for each gateway.

At the time of initial introduction, etc. of a new node into a system, the new node cannot perform secure communication with other nodes in an ad-hoc network until an encryption key is set. Therefore, it is difficult to automatically set an encryption key for the new node through the ad-hoc network and an operator has to actually go to the site to set an encryption key.

Prior arts related to secure communication include, for example, a technique in which a terminal utilizes another communication device different from the terminal to acquire various kinds of communication control information required for providing communication control from an authentication server (see, e.g., Japanese Laid-Open Patent Publication No. 2006-135874). Also included is a technique for stably executing key exchange at the start of communication in an ad-hoc network (see, e.g., Japanese Laid-Open Patent Publication No. 2007-88799). Further included is a technique related to an ad-hoc network in which each communication terminal performs mutual authentication with a nearby communication terminal by using a public key (see, e.g., Japanese Laid-Open Patent Publication No. 2007-13386).

However, if the encryption key set for nodes in an ad-hoc network is changed for each gateway, the conventional techniques have a problem in that it is difficult to identify the gateway to which a new node belongs at the time of initial introduction, etc. of the new node. For example, even if a candidate gateway can be narrowed down by the address of the location of a new node, the communication status changes due to factors such as weather and a positional relationship with nearby buildings. Therefore, an operator must actually to the site and confirm which gateway is actually communicable, arising in a problem in that the working hours of the operator and workload required for setting an encryption key increase.

SUMMARY

According to an aspect of an embodiment, a key setting method executed by a node transmitting and receiving data through multi-hop communication in an ad-hoc network among a plurality of ad-hoc networks, includes detecting connection with a mobile terminal communicating with a server connected to a gateway in each ad-hoc network among the ad-hoc networks; transmitting by simultaneously reporting to the ad-hoc network, an acquisition request for a key for encrypting the data when the connection with the mobile terminal is detected at the detecting; receiving from the server via the mobile terminal, a key specific to a gateway and transmitted from the gateway to the server consequent to transfer of the simultaneously reported acquisition request to the gateway in the ad-hoc network; and setting the key specific to the gateway received at the receiving as the key for encrypting the data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is an explanatory view of an example of a data structure of the GW search frame;

FIG. 15 is an explanatory view of an example of authentication information of the management server;

FIG. 16 is an explanatory view of an example of authentication information of a mobile terminal;

DESCRIPTION OF EMBODIMENTS

Preferred embodiments of the present invention will be explained with reference to the accompanying drawings.

Figure 1:
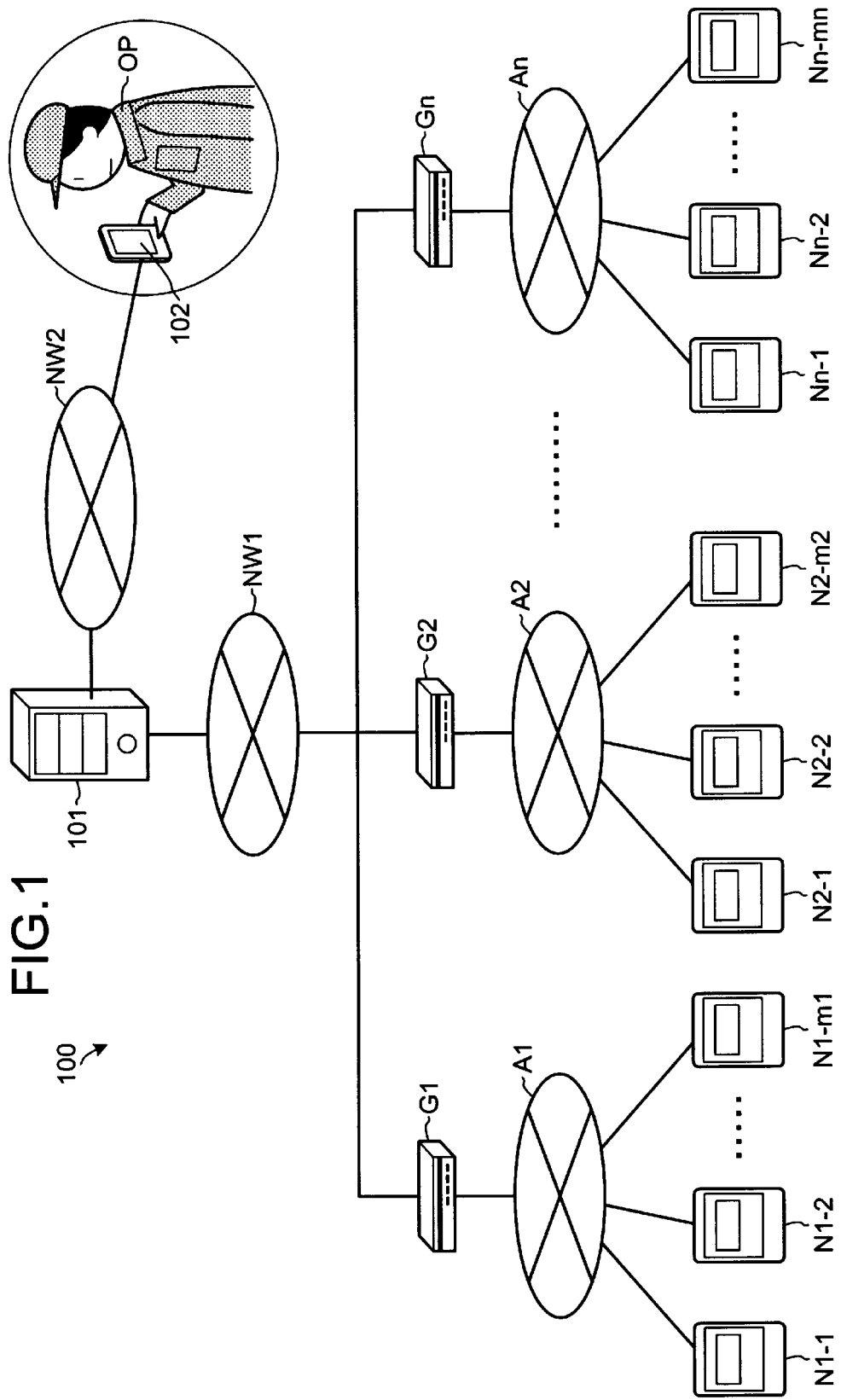
FIG. 1 is an explanatory view of one example of a network system according to an embodiment.

FIG. 1 is an explanatory view of one example of a network system according to the embodiment. In FIG. 1, a network system 100 includes a management server 101, gateways G1 to Gn, and nodes N1-1 to N1-m1, N2-1 to N2-m2, . . . , Nn-1 to Nn-mn.

The management server 101 is connected to the gateways G1 to Gn in a mutually communicable manner via a network NW1 such as the Internet, a LAN, and a WAN. The management server 101 is a computer that acquires and retains encryption keys specific to the gateways G1 to Gn, from the gateways G1 to Gn.

The encryption keys (hereinafter referred to as "encryption keys K1 to Kn") specific to the gateways G1 to Gn are key information for encrypting data transmitted and received between the nodes in ad-hoc networks A1 to An to which the gateways G1 to Gn belong. In the following description, an example of data is a packet having a header portion including a destination, etc. added to a payload portion including a data body.

The management server 101 can mutually communicate with a mobile terminal 102 via a network NW2 such as a mobile telephone network and the Internet. The mobile terminal 102 is a portable communication apparatus used by an operator OP and is, for example, a mobile telephone, a Personal Handy-phone System (PHS) telephone, a Smartphone, and a notebook personal computer.

A gateway Gi is a relay device connecting an ad-hoc network Ai and the network NW1 (i=1, 2, . . . , n). For example, the gateway Gi is connected via the ad-hoc network Ai to nodes Ni-1 to Ni-mi. The gateway Gi is connected via the network NW1 to the management server 101.

The gateway Gi understands both the protocol of the ad-hoc network Ai and the protocol of the network NW1 to transfer communications between the ad-hoc network Ai and the network NW1. The gateway Gi has an encryption key Ki specific to the gateway Gi for encrypting packets transmitted and received between nodes in the ad-hoc network Ai.

The nodes Ni-1 to Ni-mi are radio communication apparatuses performing multi-hop communication with other nodes within a predetermined communication area. In the ad-hoc network Ai, all the nodes Ni-1 to Ni-mi may not necessarily be directly communicable with the gateway Gi and only a portion of the nodes needs to be communicable with the gateway Gi.

The network system 100 is applicable to a system collecting electricity and gas usages of households, for example. For example, the nodes Ni-1 to Ni-mi are incorporated into electricity meters and gas meters of households to transmit and receive the electricity and gas usages of the households between the nodes in the ad-hoc network Ai. The electricity and gas usages of the households may be measured by the nodes Ni-1 to Ni-mi or may be acquired by the nodes Ni-1 to Ni-mi from the electricity meters and the gas meters.

The gateway Gi transmits the electricity and gas usages of the households received from the nodes Ni-1 to Ni-mi in the ad-hoc network Ai to servers (e.g., the management server 101) of an electric power company and a gas company via the network NW1. As a result, the electricity and gas usages can be collected without an operator actually going to the sites.

The network system 100 encrypts a packet by using the encryption key Ki specific to the gateway Gi for each of the ad-hoc networks Ai, thereby ensuring secure communication (data confidentiality, prevention of tampering) of the ad-hoc networks Ai. Changing the encryption key Ki for each of the ad-hoc networks Ai reduces the risk if the key is compromised.

Although one gateway Gi is disposed in the ad-hoc network Ai in the configuration of the example of FIG. 1, the gateways Gi may be disposed in plural. In this case, the encryption key Ki for encrypting the packets transmitted and received in the ad-hoc network Ai is common among the gateways Gi.

A setting example of the encryption key Ki at the time of introduction of a new node N into the network system 100 depicted in FIG. 1 will be described.

Figure 2:
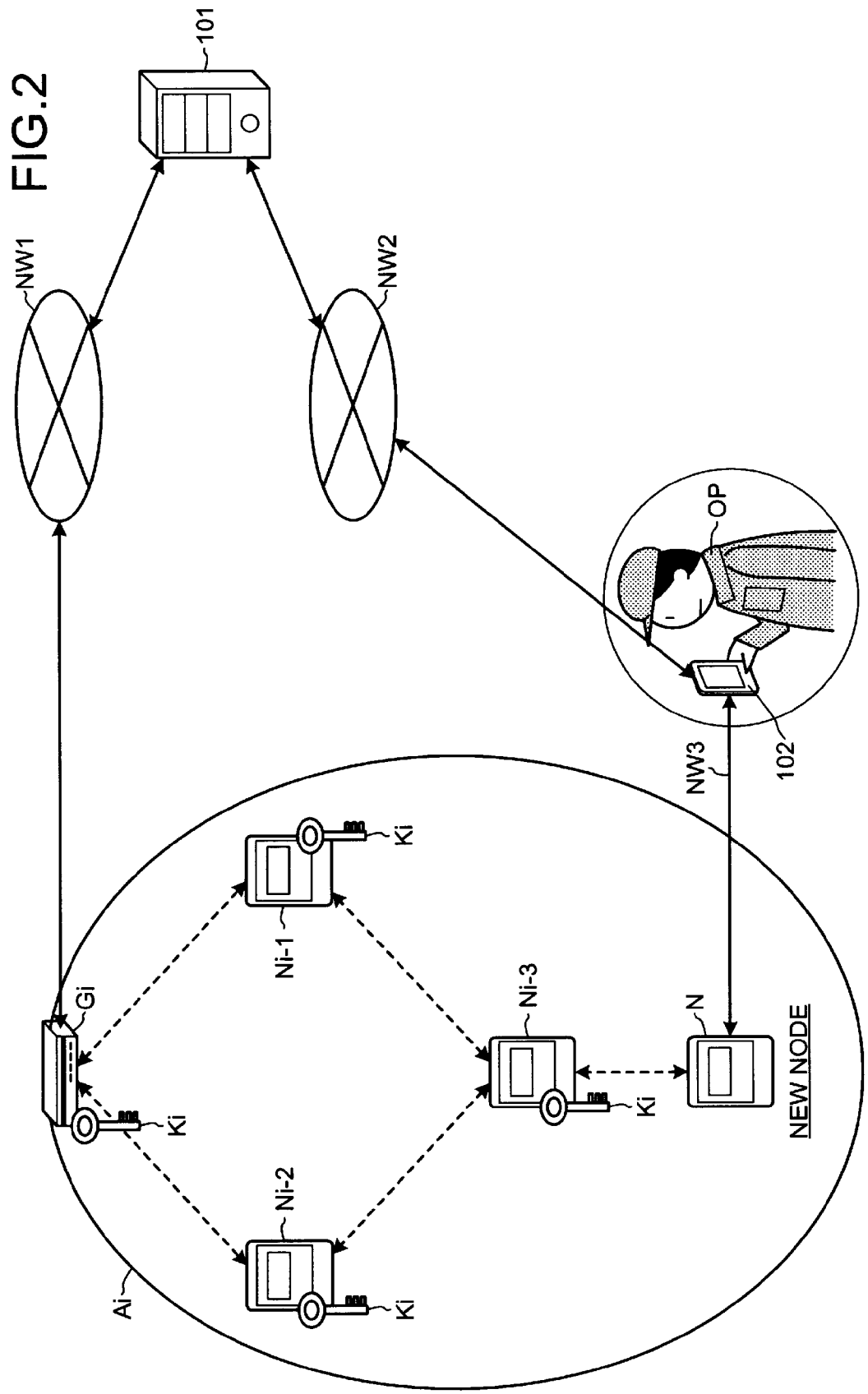
FIG. 2 is an explanatory view of an example of introducing a new node into the network system.

FIG. 2 is an explanatory view of an example of introducing a new node into the network system. In FIG. 2, the new node N is introduced into the ad-hoc network Ai of the network system 100. FIG. 2 depicts the nodes Ni-1 to Ni-3 as the representatives of the nodes Ni-1 to Ni-mi in the ad-hoc network Ai.

At the time of introduction of the new node N, the operator OP does not know to which ad-hoc network Ai the new node N belongs. Therefore, in this embodiment, the mobile terminal 102 used by the operator OP is utilized to acquire the encryption key Ki to be set in the new node N for automatic setting in the new node N. An operation example of the network system 100 at the time of introduction of the new node N depicted in FIG. 2 will be described hereinafter.

Figure 3:
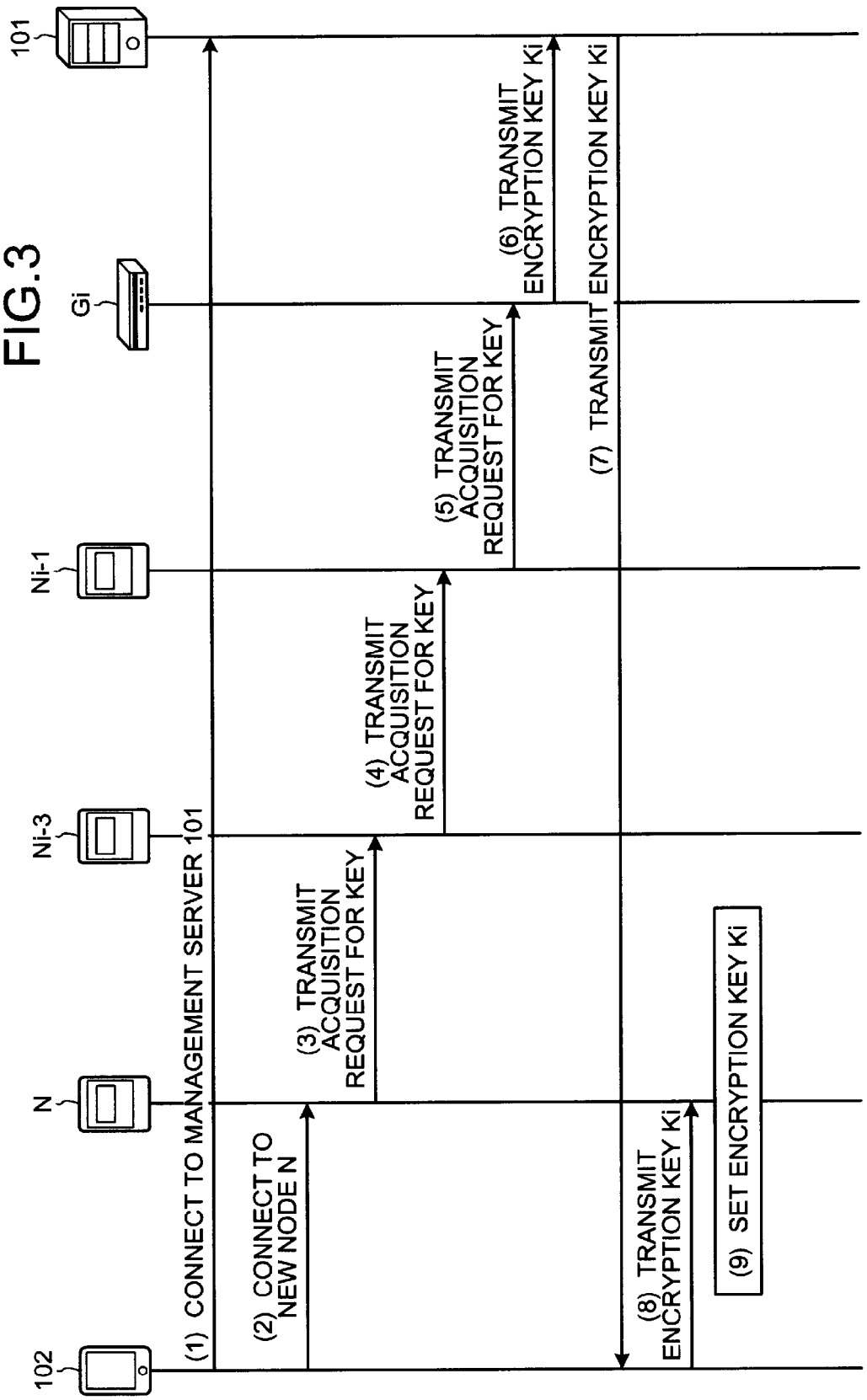
FIG. 3 is a sequence diagram of an operation example of the network system at the time of introduction of a new node.

FIG. 3 is a sequence diagram of an operation example of the network system at the time of introduction of a new node. In the sequence diagram of FIG. 3, (1) the mobile terminal 102 connects, via the network NW2, to the management server 101. In this case, the mobile terminal 102 uses, for example, Secure Socket Layer (SSL) to perform secure communication with the management server 101. A communication mode for implementing the secure communication between the management server 101 and the mobile terminal 102 will be described with reference to FIGS. 15 and 16.

(2) The mobile terminal 102 connects, via a wired or wireless network NW3, to the new node N. For example, the operator OP connects the mobile terminal 102 and the new node N by using a Universal Serial Bus (USB) cable to establish the network NW3 between the mobile terminal 102 and the new node N.

(3) When detecting the connection with the mobile terminal 102, the new node N broadcasts to the ad-hoc network Ai, an acquisition request for a key for encrypting the packets transmitted and received through multi-hop communication in the ad-hoc network Ai. In this example, the acquisition request for the key is transmitted to the node Ni-3 located in the communication area of the new node N.

(4) The node Ni-3 transmits the acquisition request for the key, from the new node N to the node Ni-1 in the communication area. (5) The node Ni-1 transmits the acquisition request for the key, from the node Ni-3 to the gateway Gi in the communication area. As a result, the acquisition request for the key from the new node N is transferred to the gateway Gi in the ad-hoc network Ai.

(6) When receiving the acquisition request for the key from the new node N, the gateway Gi transmits to the management server 101, the encryption key Ki specific to the gateway Gi. (7) The management server 101 transmits the encryption key Ki specific to the gateway Gi, from the gateway Gi to the mobile terminal 102, via the network NW2.

(8) The mobile terminal 102 transmits the encryption key Ki specific to the gateway Gi, from the management server 101 to the new node N, via the network NW3. (9) The new node N sets the encryption key Ki from the mobile terminal 102 as the encryption key for encrypting packets.

The connection between the mobile terminal 102 and the new node N is maintained until the setting of the encryption key Ki to the new node N is terminated. When the setting of the encryption key Ki is terminated and the connection between the mobile terminal 102 and the new node N is released, the encryption key Ki may be deleted automatically in the mobile terminal 102. As a result, risk can be reduced in such a case as the mobile terminal 102 becoming lost.

As described, the network system 100 according to this embodiment can establish a temporary communication path between the new node N and the management server 101, via the mobile terminal 102 of the operator OP at the time of introduction of the new node N. As a result of transfer of the acquisition request for the key broadcasted from the new node N to the gateway Gi, the encryption key Ki transmitted from the gateway Gi to the management server 101 can be provided from the management server 101 to the new node N, via the mobile terminal 102. Therefore, the encryption key Ki to be set in the new node N can be easily acquired and the efficiency in setting the encryption key Ki used by the new node N can be increased.

In the following description, a "node N" refers to a node transmitting and receiving a packet through the multi-hop communication in any ad-hoc network Ai, among the ad-hoc networks A1 to An of the network system 100. "Node, etc." refers to the gateways G1 to Gn of the network system 100 and the node N.

Figure 4:
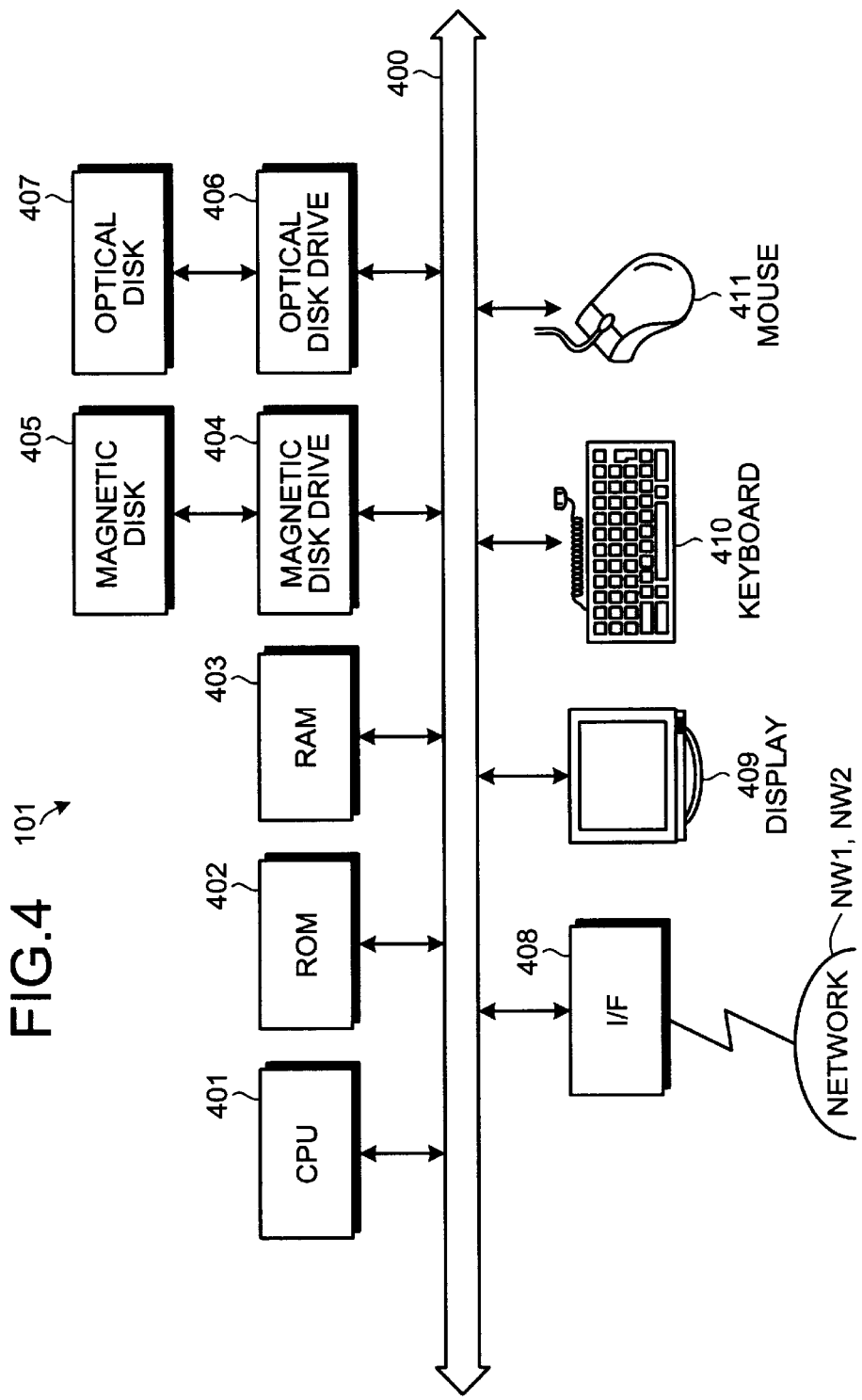
FIG. 4 is a block diagram of a hardware configuration of a management server according to the embodiment.

FIG. 4 is a block diagram of a hardware configuration of a management server according to the embodiment. As depicted in FIG. 4, the management server includes a central processing unit (CPU) 401, a read-only memory (ROM) 402, a random access memory (RAM) 403, a magnetic disk drive 404, a magnetic disk 405, an optical disk drive 406, an optical disk 407, an interface (I/F) 408, a display 409, a keyboard 410, and a mouse 411, respectively connected by a bus 400.

The CPU 401 governs overall control of the management server. The ROM 402 stores therein programs such as a boot program. The RAM 403 is used as a work area of the CPU 401. The magnetic disk drive 404, under the control of the CPU 401, controls the reading and writing of data with respect to the magnetic disk 405. The magnetic disk 405 stores therein data written under control of the magnetic disk drive 404.

The optical disk drive 406, under the control of the CPU 401, controls the reading and writing of data with respect to the optical disk 407. The optical disk 407 stores therein data written under the control of the optical disk drive 406, the data being read by a computer.

The I/F 408 is connected to the networks NW1 and NW2 through a communication line and is connected to other apparatuses through the networks NW1 and NW2. The I/F 408 administers an internal interface with the networks NW1 and NW2 and controls the input/output of data from/to external apparatuses. For example, a modem or a LAN adaptor may be employed as the I/F 408.

The display 409 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 409.

The keyboard 410 includes, for example, keys for inputting letters, numerals, and various instructions and performs the input of data. Alternatively, a touch-panel-type input pad or numeric keypad, etc. may be adopted. The mouse 411 is used to move the cursor, select a region, or move and change the size of windows. A track ball or a joy stick may be adopted provided each respectively has a function similar to a pointing device. The mobile terminal 102 depicted in GIF. 2 can also be configured by the same hardware as that of the management server 101 depicted in FIG. 4.

Figure 5:
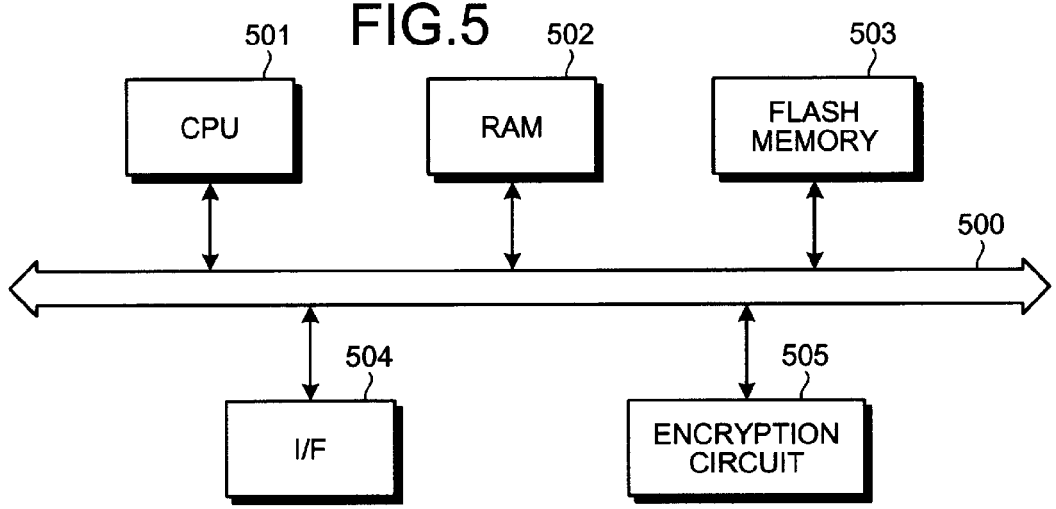
FIG. 5 is a block diagram of a hardware configuration of a node, etc. according to the embodiment.

FIG. 5 is a block diagram of a hardware configuration of the node, etc. according to the embodiment. In FIG. 5, the node, etc. include a CPU 501, a RAM 502, a flash memory 503, an I/F 504, and an encryption circuit 505. The CPU 501 to the encryption circuit 505 are connected through a bus 500.

The CPU 501 governs overall control of the node etc. The RAM 502 is used as a work area of the CPU 501. The flash memory 503 stores programs and key information of an encryption key, etc. The I/F 504 transmits and receives packets through multi-hop communication. The I/F 504 of the gateway Gi is connected through a communication line to the network NW1 and is connected via the network NW1 to the management server 101.

The encryption circuit 505 is a circuit that encrypts data using an encryption key if the data is to be encrypted. If the encryption is executed by software, the need for the encryption circuit 505 is eliminated by storing a program corresponding to the encryption circuit 505 into the flash memory 503.

Figure 6:
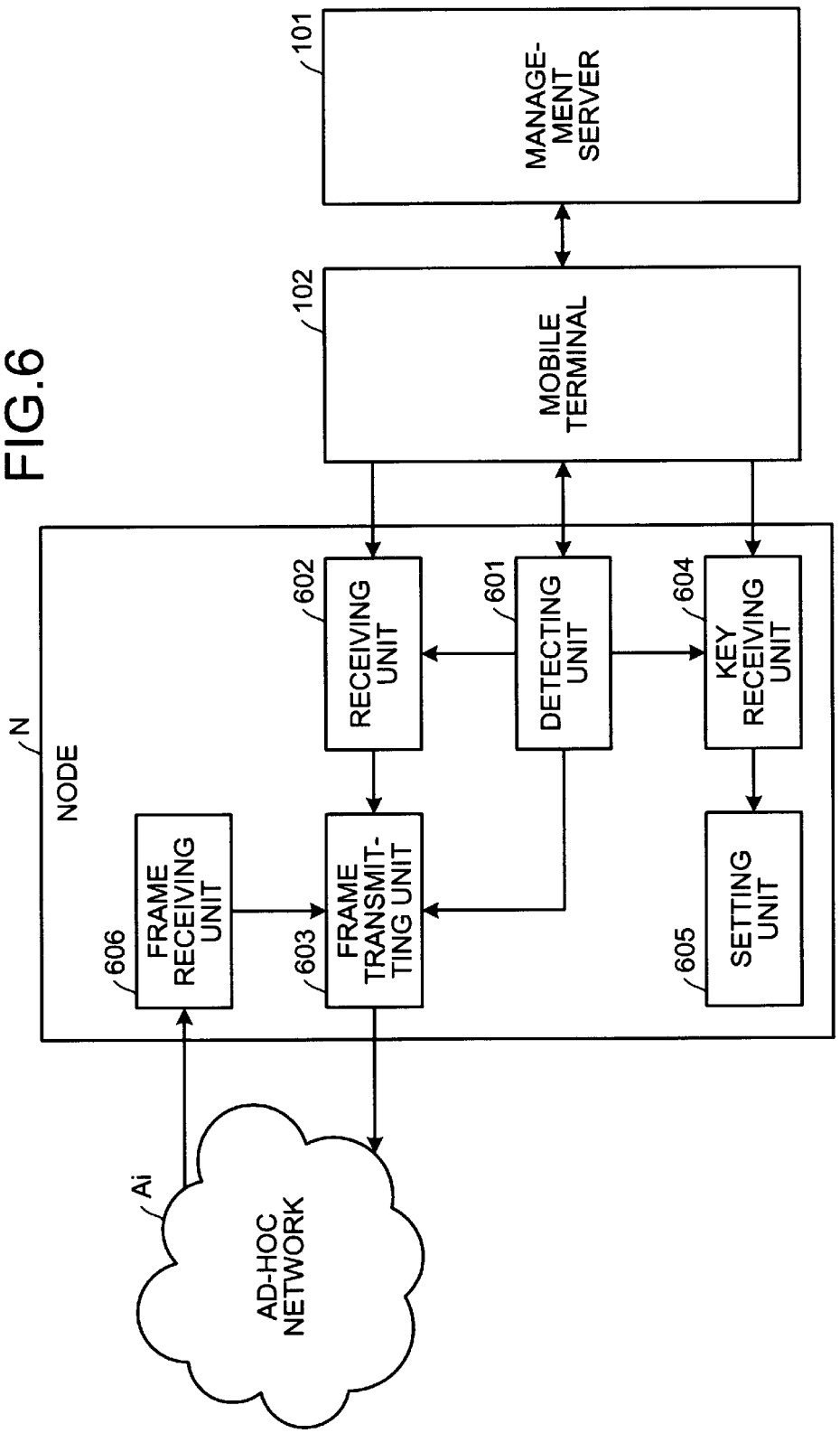
FIG. 6 is a block diagram of a functional configuration of the node.

FIG. 6 is a block diagram of a functional configuration of a node. In FIG. 6, the node N includes a detecting unit 601, a receiving unit 602, a frame transmitting unit 603, a key receiving unit 604, a setting unit 605, and a frame receiving unit 606. For example, functions of the functional units (the detecting unit 601 to the frame receiving unit 606) are implemented by executing on the CPU 501, programs stored in a storage device such as the RAM 502 and the flash memory 503 depicted in FIG. 5 or via the I/F 504. Process results obtained by the functional units (the detecting unit 601 to the frame receiving unit 606) are stored to a storage device such as the RAM 502 and the flash memory 503 unless otherwise specified.

The detecting unit 601 detects connection with the mobile terminal 102 communicable with the management server 101. For example, the operator OP connects the mobile terminal 102 and the node N by using an USB cable and, as a result, the detecting unit 601 detects the connection via the USB cable with the mobile terminal 102.

The receiving unit 602 receives a transmission instruction for an acquisition request for a key from the mobile terminal 102 detected as being connected by the detecting unit 601. The acquisition request for a key is an acquisition request for the encryption key Ki for encrypting packets transmitted and received between nodes through the multi-hop communication within the ad-hoc network Ai.

The acquisition request for a key is for the purpose of searching the gateway Gi in the ad-hoc network Ai to which the node N belongs and having the encryption key Ki specific to the gateway Gi provided from the gateway Gi. Therefore, in the following description, the "acquisition request for a key" will be referred to as a "GW search frame" for searching the gateway Gi serving as a provider of the key.

For example, the receiving unit 602 receives a transmission instruction for the GW search frame from the mobile terminal 102 via the network NW3 such a USB cable. An example of the transmission instruction for the GW search frame will be described.

Figure 7:
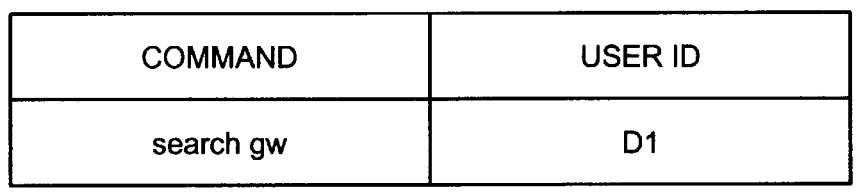
FIG. 7 is an explanatory view of an example of a transmission instruction for a GW search frame.

FIG. 7 is an explanatory view of an example of the transmission instruction for the GW search frame. In FIG. 7, a transmission instruction 700 has a command and a user ID. The command indicates instruction details for the node N. In this example, "search gw" is described and represents a search instruction for the gateway Gi in the ad-hoc network Ai to which the node N belongs. The user ID is an identifier of the mobile terminal 102. In this example, "D1" is described.

Returning to the description of FIG. 6, the frame transmitting unit 603 broadcasts the GW search frame to the ad-hoc network Ai. The GW search frame is information including, for example, the frame type, the identifier of the mobile terminal 102, and the identifier of the node N and is an unencrypted normal frame.

The identifier of the mobile terminal 102 is identified from, for example, the transmission instruction for the GW search frame received by the receiving unit 602. The identifier of the node N is set and stored in advance in, for example, a storage device such as the RAM 502 and the flash memory 503. For example, if a connection with the mobile terminal 102 is detected, the frame transmitting unit 603 may broadcast the GW search frame to the ad-hoc network Ai.

Alternatively, for example, if the transmission instruction for the GW search frame is received from the mobile terminal 102, the frame transmitting unit 603 may broadcast the GW search frame to the ad-hoc network Ai. In other words, if the connection with the mobile terminal 102 is detected and the transmission instruction for the GW search frame is received, the frame transmitting unit 603 broadcasts the GW search frame to the ad-hoc network Ai.

As a result, when a setting operation different from the key setting is performed with respect to the node N by utilizing the mobile terminal 102, the node N can be prevented from broadcasting the GW search frame at the time of detection of the connection with the mobile terminal 102. An example of the GW search frame will be described.

FIG. 8 is an explanatory view of an example of a data structure of the GW search frame. In FIG. 8, a GW search frame 800 includes a header portion 810 and a payload portion 820. A destination address, a sender address, a type, a size, and a hop number are described in the header portion 810. A user ID and a node ID are described in the payload portion 820.

The destination address is an address of a transmission destination. In this example, a Media Access Control (MAC) address "FF:FF:FF:FF:FF:FF" for broadcast is described. The sender address is an address of a transmission source. In this example, a MAC address of another node N different from the node N in the ad-hoc network A1 is described. The type is a type of a frame. In this example, "2" indicative of a GW search frame is described. The size is a data size (byte) of a frame.

The hop number is the remaining number of times of transfer indicative of how many times the GW search frame 800 will be transferred between nodes. The maximum value of the hop number of the GW search frame 800 broadcasted from the node N is set in advance. The hop number is decremented at the time of transfer of the GW search frame 800 and the GW search frame 800 having a hop number that has become "0" is discarded. In this example, the hop number "10" of the GW search frame 800 is described.

The user ID is an identifier of the mobile terminal 102 connected to the node N. In this example, a user ID "D1" is described. The node ID is an identifier of the node N. In this example, a node ID "N1-x" is described. Although the MAC addresses are used as examples of the destination address and the sender address in this description, addresses such as Internet Protocol addresses may also be used.

Returning to the description of FIG. 6, the key receiving unit 604 receives the encryption key Ki specific to the gateway Gi in the ad-hoc network Ai to which the node N belongs, via the mobile terminal 102 from the management server 101. The encryption key Ki specific to the gateway Gi is a key transmitted from the gateway Gi to the management server 101 as a result of the transfer of the broadcasted GW search frame to the gateway Gi.

This encryption key Ki is a key for encrypting packets transmitted and received between the nodes in the ad-hoc network Ai and is binary data of about 128 to 256 bits, for example. This encryption key Ki is, for example, a common key capable of encrypting a packet and decrypting the packet encrypted by using the encryption key Ki.

For example, a GW search frame broadcasted from the node N is transferred via the ad-hoc network Ai to the gateway Gi. As a result, the gateway Gi transmits the encryption key Ki specific to the gateway Gi, via the network NW1, to the management server 101. The management server 101 transmits the encryption key Ki specific to the gateway Gi, via the network NW2, to the mobile terminal 102. The key receiving unit 604 receives the encryption key Ki specific to the gateway Gi, via the network NW3, from the mobile terminal 102.

The setting unit 605 sets the received encryption key Ki specific to the gateway Gi as a key for encrypting packets. As a result, the node N can subsequently encrypt packets to be transmitted, decrypt encrypted packets, and can perform secure communication between the nodes in the ad-hoc network Ai.

The frame receiving unit 606 receives a GW search frame from another node different from its own node in the ad-hoc network Ai. In other words, the frame receiving unit 606 receives the GW search frame broadcasted from another node for setting a key in another node in the ad-hoc network Ai.

In this case, the node N transfers the received GW search frame from another node to a different node. However, in the ad-hoc network Ai, the node N may be set to discard a normal frame in terms of security, if an unencrypted normal frame is received.

Therefore, if the type of a received normal frame is "2" indicative of a GW search frame, the frame transmitting unit 603 may broadcast the normal frame to the ad-hoc network Ai. As a result, a GW search frame from another node different from its own node in the ad-hoc network Ai can be transferred to a different node.

Figures 9, 10:
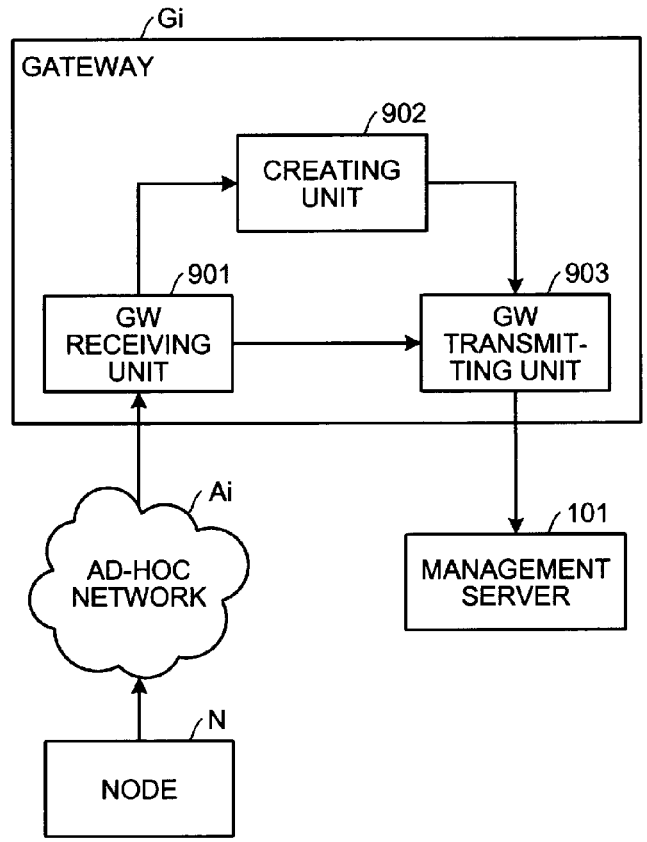
FIG. 9 is a block diagram of a functional configuration of a gateway.
FIG. 10 is an explanatory view (part 1) of an example of a key notification frame.

FIG. 9 is a block diagram of a functional configuration of a gateway. In FIG. 9, the gateway Gi includes a GW receiving unit 901, a creating unit 902, and a GW transmitting unit 903. For example, the functions of the functional units (the GW receiving unit 901 to the GW transmitting unit 903) are implemented by executing on the CPU 501, programs stored in a storage device such as the RAM 502 and the flash memory 503 depicted in FIG. 5 or via the I/F 504. The process results of the functional units (the GW receiving unit 901 to the GW transmitting unit 903) are stored in a storage device such as the RAM 502 and the flash memory 503.

The GW receiving unit 901 receives, via the ad-hoc network Ai, the GW search frame broadcasted from the node N.

For example, the GW receiving unit 901 directly receives the GW search frame from another node different from the node N in the ad-hoc network Ai.

If the GW search frame is received, the creating unit 902 creates a key notification frame representative of a notification request for the encryption key Ki specific to the gateway Gi. The key notification frame is information that includes the identifier of the mobile terminal 102, the identifier of the node N, an identifier of the gateway Gi, and the encryption key Ki specific to the gateway Gi, for example.

The identifier of the mobile terminal 102 and the identifier of the node N are identified from the received GW search frame. The encryption key Ki specific to the gateway Gi is stored in a storage device such as the RAM 502 and the flash memory 503, for example. For example, the creating unit 902 creates the key notification frame representative of a notification request for the encryption key Ki specific to the gateway Gi, based on the received GW search frame 800. An example of the key notification frame will be described.

FIG. 10 is an explanatory view (part 1) of an example of the key notification frame. In FIG. 10, a key notification frame 1000 has information related to a user ID, a node ID, a gateway ID, and an encryption key. The user ID is the identifier of the mobile terminal 102. This user ID is identified from the payload portion 820 of the GW search frame 800 depicted in FIG. 8. The node ID is the identifier of the node N. This node ID is identified from the payload portion 820 of the GW search frame 800. The gateway ID is the identifier of the gateway Gi. The encryption key is the encryption key Ki specific to the gateway Gi.

Returning to the description of FIG. 9, the GW transmitting unit 903 transmits the encryption key Ki specific to the gateway Gi via the network NW1 to the management server 101. For example, the GW transmitting unit 903 may transmit the created key notification frame 1000 to the management server 101, thereby enabling the management server 101 to identify the mobile terminal 102 and the node N serving as providers of the encryption key Ki, as compared to a case of transmitting only the encryption key Ki specific to the gateway Gi.

Although details are described later, if the management server 101 is configured to retain the encryption keys K1 to Kn specific to the gateways G1 to Gn, the key notification frame need not include the encryption key Ki specific to the gateway Gi. Therefore, the creating unit 902 may create a key notification frame 1100 that does not include the encryption key Ki specific to the gateway Gi as depicted in FIG. 11, for example.

Figures 11, 12:
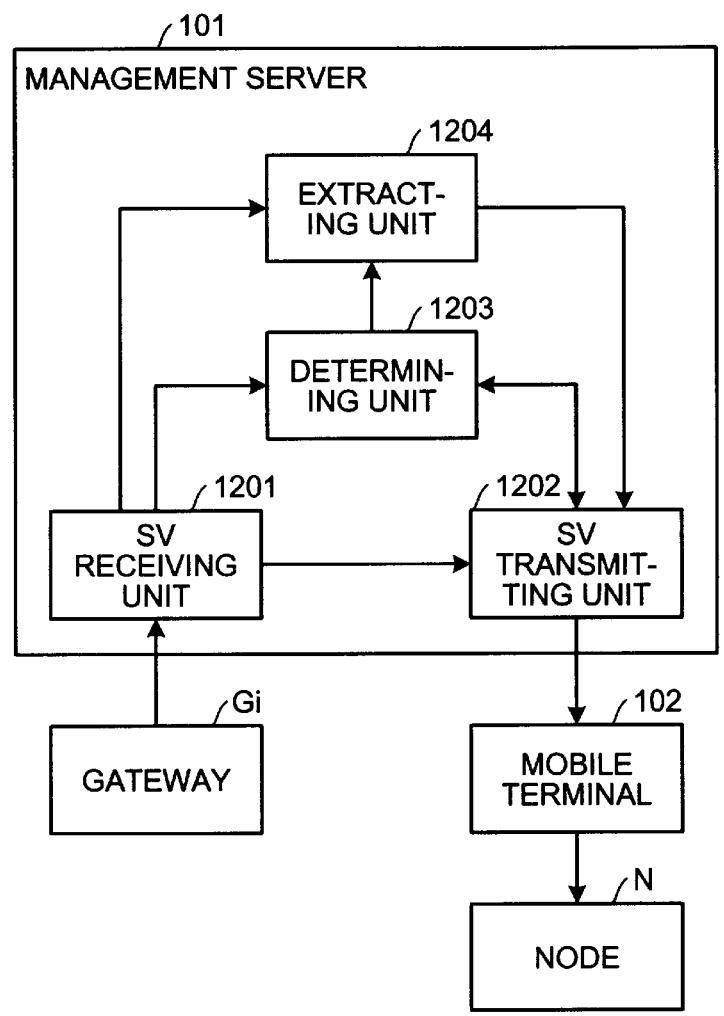
FIG. 11 is an explanatory view (part 2) of an example of the key notification frame.
FIG. 12 is a block diagram of a functional configuration of the management server.

FIG. 11 is an explanatory view (part 2) of an example of the key notification frame. In FIG. 11, the key notification frame 1100 has information related to the user ID, the node ID, and the gateway ID. Therefore, the key notification frame 1100 is acquired by deleting the encryption key K1 specific to the gateway G1 from the key notification frame 1000 depicted in FIG. 10.

If the management server 101 is configured to retain the encryption keys K1 to Kn specific to the gateways G1 to Gn, the GW transmitting unit 903 transmits the key notification frame 1100 not including the encryption key K1 specific to the gateway G1 to the management server 101, for example.

FIG. 12 is a block diagram of a functional configuration of the management server. In FIG. 12, the management server 101 includes an SV receiving unit 1201, an SV transmitting unit 1202, a determining unit 1203, and an extracting unit 1204. For example, the functions of the functional units (the SV receiving unit 1201 to the extracting unit 1204) are implemented by the CPU 401 executing programs stored in a storage device such as the ROM 402, the RAM 403, the magnetic disk 405, and the optical disk 407 depicted in FIG. 4 or by the I/F 408. The process results of the functional units (the SV receiving unit 1201 to the extracting unit 1204) are stored in a storage device such as the RAM 403, the magnetic disk 405, and the optical disk 407, for example.

The SV receiving unit 1201 receives the encryption key Ki specific to the gateway Gi via the network NW1 from the gateway Gi. For example, the SV receiving unit 1201 receives the key notification frame 1000 depicted in FIG. 10, via the network NW1. The key notification frame 1000 is a notification request for the encryption key Ki specific to the gateway Gi to the mobile terminal 102.

The SV transmitting unit 1202 transmits the received encryption key Ki specific to the gateway Gi, via the network NW2, to the mobile terminal 102. For example, the SV transmitting unit 1202 transmits the received key notification frame 1000, via the network NW2, to the mobile terminal 102. As a result, the mobile terminal 102 transmits the encryption key K1 included in the key notification frame 1000, via the network NW3, to the node N.

The management server 101 may be connected via the network NW2 to multiple mobile terminals 102 in a communicable manner. In this case, for example, the SV transmitting unit 1202 can distinguish the mobile terminal 102 of the transmission destination from the user ID included in the key notification frame 1000. In the example of the key notification frame 1000, the SV transmitting unit 1202 transmits the key notification frame 1000 to the mobile terminal 102 of the user ID "D1".

Multiple routes may exist from the node N in the ad-hoc network Ai to reach the gateway Gi. In this case, the GW search frame broadcasted from the node N reaches the gateway Gi through multiple routes. As a result, the gateway Gi receives the GW search frame broadcasted from the node N multiple times.

In this case, the gateway Gi creates and transmits a key notification frame to the management server 101, each time the GW search frame is received. The management server 101 transmits the key notification frame to the mobile terminal 102, each time the key notification frame is received. As a result, the mobile terminal 102 receives the same key notification frame from the management server 101 multiple times.

If the operator OP uses the same mobile terminal 102 to successively perform the key setting for multiple nodes N, this may cause a wrong encryption key Ki to be set in a node N. For example, it is assumed that the key setting is successively performed for the node N1-x in the ad-hoc network A1 and the node N2-x in the ad-hoc network A2. In this case, after the setting of the encryption key K1 for the node N1-x is completed and the operator OP connects the mobile terminal 102 to the node N2-x, if the key notification frame including the encryption key K1 is received from the management server 101, the encryption key K1 is wrongly set in the node N2-x.

Therefore, the same key notification frame can be prevented from being redundantly transmitted to the mobile terminal 102 by the management server 101 managing the nodes N having the encryption key Ki (key notification frame) already transmitted. An example of a transmission completion list for managing the nodes N having the key notification frame already transmitted will be described.

Figure 13:
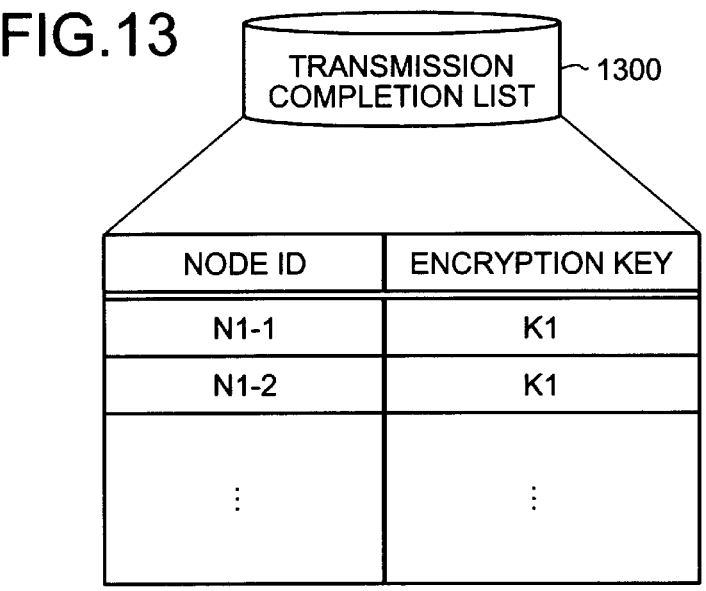
FIG. 13 is an explanatory view of an example of a transmission completion list.

FIG. 13 is an explanatory view of an example of the transmission completion list. In FIG. 13, a transmission completion list 1300 correlates and stores the node IDs of the nodes N for which the encryption key Ki have been transmitted and the transmitted encryption key Ki. The transmission completion list 1300 is implemented by a storage device such as the RAM 403, the magnetic disk 405, and the optical disk 407, for example.

In the example of FIG. 13, the node ID "N1-1" of the node N1-1 in the ad-hoc network A1 and the "encryption key K1" transmitted to the node N1-1 are correlated and stored. The node ID "N1-2" of the node N1-2 in the ad-hoc network A1 and the "encryption key K1" transmitted to the node N1-2 are correlated and stored.

Returning to the description of FIG. 12, the determining unit 1203 refers to the transmission completion list managing the nodes N for which the encryption key K1 has been transmitted and determines whether a key notification frame is to be transmitted to the mobile terminal 102. For example, the determining unit 1203 refers to the transmission completion list 1300 to determine whether a node ID included in a key notification frame is registered.

If the node ID included in a key notification frame is registered, the determining unit 1203 determines that the key notification frame is not to be transmitted to the mobile terminal 102. In this case, the SV transmitting unit 1202 does not execute the transmission process of the key notification frame. On the other hand, if the node ID included in a key notification frame is not registered, the determining unit 1203 determines that the key notification frame is to be transmitted to the mobile terminal 102.

The SV transmitting unit 1202 transmits the key notification frame to the mobile terminal 102. When the key notification frame is transmitted to the mobile terminal 102, the node ID and the encryption key Ki included in the key notification frame are registered in the transmission completion list 1300, for example. In the example of the key notification frame 1000, the node ID "N1-x" and the encryption key "Ki" are correlated and registered in the transmission completion list 1300.

As a result, the same key notification frame can be prevented from being redundantly transmitted to the mobile terminal 102. The management of the nodes N for which the encryption key Ki has been transmitted can also prevent transmission of different encryption keys in such a case when the node N is disposed in a vicinity of a boundary of different ad-hoc networks.

For example, if the location of the node N is in a vicinity of the boundary between the ad-hoc networks A1 and A2, the GW search frame broadcasted from the node N may be transferred to the gateways G1 and G2. In this case, the management server 101 receives the key notification frames from the gateways G1 and G2 and transmits the key notification frames to the mobile terminal 102. As a result, different encryption keys K1 and K2 are transmitted to the node N. Therefore, the nodes N for which the encryption key Ki has been transmitted are managed to prevent the transmission of different encryption keys to the node N.

The determining unit 1203 may refer to the transmission completion list 1300 to determine whether a paired node ID and encryption key included in a key notification frame are registered. If the paired node ID and encryption key included in the key notification frame are registered, the determining unit 1203 determines that the key notification frame is not to be transmitted to the mobile terminal 102.

On the other hand, if the paired node ID and encryption key included in the key notification frame are not registered or if either the node ID or the encryption key is registered, the determining unit 1203 determines that the key notification frame is transmitted to the mobile terminal 102. Therefore, even when the node ID included in the key notification frame is registered, if the encryption key is not registered, the determining unit 1203 determines that the key notification frame is to be transmitted to the mobile terminal 102. As a result, for example, after the encryption key K is set in the node N in the ad-hoc network A1, if the node N is moved and used in different location belonging to another ad-hoc network A2, the new encryption key K2 to be set in the node N can be provided.

After the transmission of the key notification frame to the mobile terminal 102 by the SV transmitting unit 1202, if the connection with the mobile terminal 102 is disconnected, the management server 101 may delete the key notification frame received from the gateway Gi.

Although the key notification frame including the encryption key Ki specific to each gateway Gi is transmitted from the gateway Gi to the management server 101 in the description, configuration is not limited hereto. For example, the management server 101 may be configured to preliminarily retain the encryption keys K1 to Kn specific to the gateways G1 to Gn in the network system 100. An example of an encryption key DB (database) retaining the encryption keys K1 to Kn specific to the gateways G1 to Gn will be described.

Figure 14:
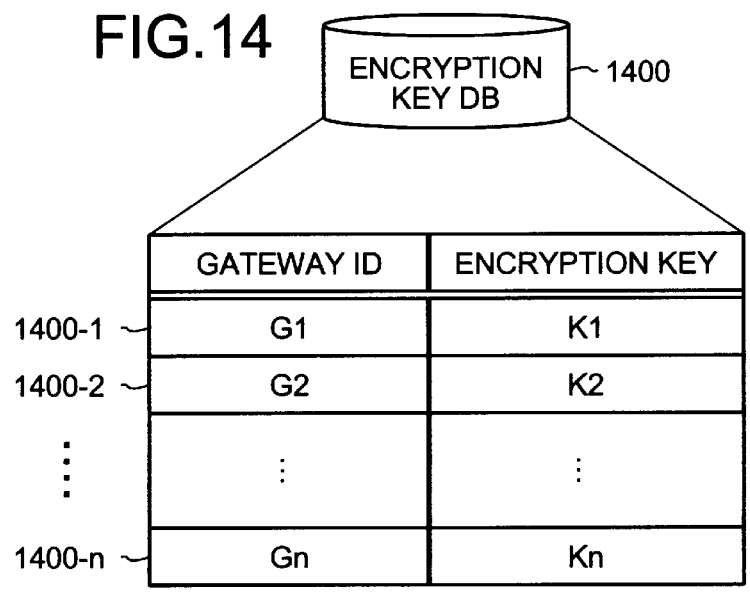
FIG. 14 is an explanatory view of an example of storage contents of an encryption key DB.

FIG. 14 is an explanatory view of an example of storage contents of the encryption key DB. In FIG. 14, an encryption key DB 1400 has fields of gateway IDs and encryption keys and sets information in each field to store key information records 1400-1 to 1400-n of the respective gateways G1 to Gn.

The gateway IDs are the identifiers of the gateways Gi. The encryption keys are the encryption keys Ki specific to the gateways Gi. Taking the key information record 1400-1 as an example, the encryption key K1 specific to the gateway G1 is stored. The encryption key DB 1400 is implemented by a storage device such as the RAM 403, the magnetic disk 405, and the optical disk 407, for example.

If the management server 101 retains the encryption keys K1 to Kn specific to the gateways G1 to Gn, the SV receiving unit 1201 receives a key notification frame that does not include the encryption key Ki specific to the gateway Gi, via the network NW1, from the gateway Gi. For example, the SV receiving unit 1201 receives the key notification frame 1100, via the network NW1, from the gateway Gi.

If a key notification frame that does not include the encryption key Ki specific to the gateway Gi is received, the extracting unit 1204 extracts the encryption key Ki specific to the gateway Gi from the encryption key DB 1400. For example, the extracting unit 1204 extracts from the encryption key DB 1400, the encryption key K1 stored and correlated with the gateway ID "G1" included in the received key notification frame 1100.

The SV transmitting unit 1202 transmits the extracted encryption key Ki specific to the gateway Gi, via the network NW2, to the mobile terminal 102. As described, the transmission of a key notification frame that does not include the encryption key Ki, from the gateway Gi, can reduce a data amount at the time of communication between the gateway Gi and the management server 101 as compared to a case of transmitting a key notification frame that includes the encryption key Ki.

The gateway Gi may be driven to transmit a key notification frame that includes the encryption key Ki only at the first time of transmission of the key notification frame to the management server 101 and may subsequently be driven to transmit the key notification frame without the encryption key Ki. In this case, the management server 101 may correlate and register the encryption key Ki included in the key notification frame with the gateway ID into the encryption key DB 1400, at the first time of transmission of the key notification frame, thereby eliminating the need of the management server 101 to preliminarily retain the encryption keys K1 to Kn specific to the gateways G1 to Gn.

If the gateway Gi transmits to the management server 101, a key notification frame that includes the encryption key Ki, the extraction process of the encryption key Ki is not necessary and therefore, the management server 101 may be configured without the extracting unit 1204 and the encryption key DB 1400.

One example of a communication mode between the management server 101 and the mobile terminal 102 will be described. First, the server authentication of the management server 101 from the viewpoint of the mobile terminal 102 will be described. For example, first, the mobile terminal 102 uses a predetermined IP address to connect to the management server 101.

The mobile terminal 102 receives an SSL server certificate from the management server 101. The received SSL server certificate is correlated with the IP address of the management server 101 and stored into a storage device of the mobile terminal 102 as depicted in FIG. 15, for example.

FIG. 15 is an explanatory view of an example of authentication information of the management server. In FIG. 15, authentication information 1500 of the management server 101 has an IP address and an SSL server certificate. The IP address is the IP address of the management server 101. The X.509 certificate is the SSL server certificate (public key certificate) of the management server 101.

The mobile terminal 102 decrypts the SSL server certificate by using a public key preliminarily built into the mobile terminal 102 to perform server authentication. The public key is a key issued by a third-party certifier, for example. If the SSL server certificate can correctly be decrypted by using this public key, the SSL server certificate is a proper certificate certified by the third-party certifier and therefore, this means that the identity of the management server 101 is certified.

The user authentication of the mobile terminal 102 from the viewpoint of the management server 101 will be described. A case of performing the user authentication of the mobile terminal 102 by using authentication information 1600 of the mobile terminal 102 as depicted in FIG. 16 will be taken as an example in this description. The authentication information 1600 is stored in a storage device such as the ROM 402, the RAM 403, the magnetic disk 405, and the optical disk 407 of the management server 101, for example.

FIG. 16 is an explanatory view of an example of authentication information of the mobile terminal. In FIG. 16, the authentication information 1600 of the mobile terminal 102 has a user ID and a password. The user ID is the identifier of the mobile terminal 102. The password is for the purpose of authenticating a user using the mobile terminal 102.

For example, first, the mobile terminal 102 transmits a paired user ID and password to the management server 101. The user ID and the password may be registered in advance in a storage device of the mobile terminal 102 or may be received through operation input by a user using an input device (not depicted) of the mobile terminal 102.

Subsequently, the management server 101 determines whether the paired user ID and password from the mobile terminal 102 matches a paired user ID and password of the authentication information 1600. If the paired user ID and password from the mobile terminal 102 matches the user ID and the password of the authentication information 1600, the identity of the user of the mobile terminal 102 is certified.

After the authentication, for example, the mobile terminal 102 encrypts a packet by using the public key included in the SSL server certificate of the management server 101 and communicates with the management server 101. As a result, secure communication can be performed between the management server 101 and the mobile terminal 102.

Figure 17:
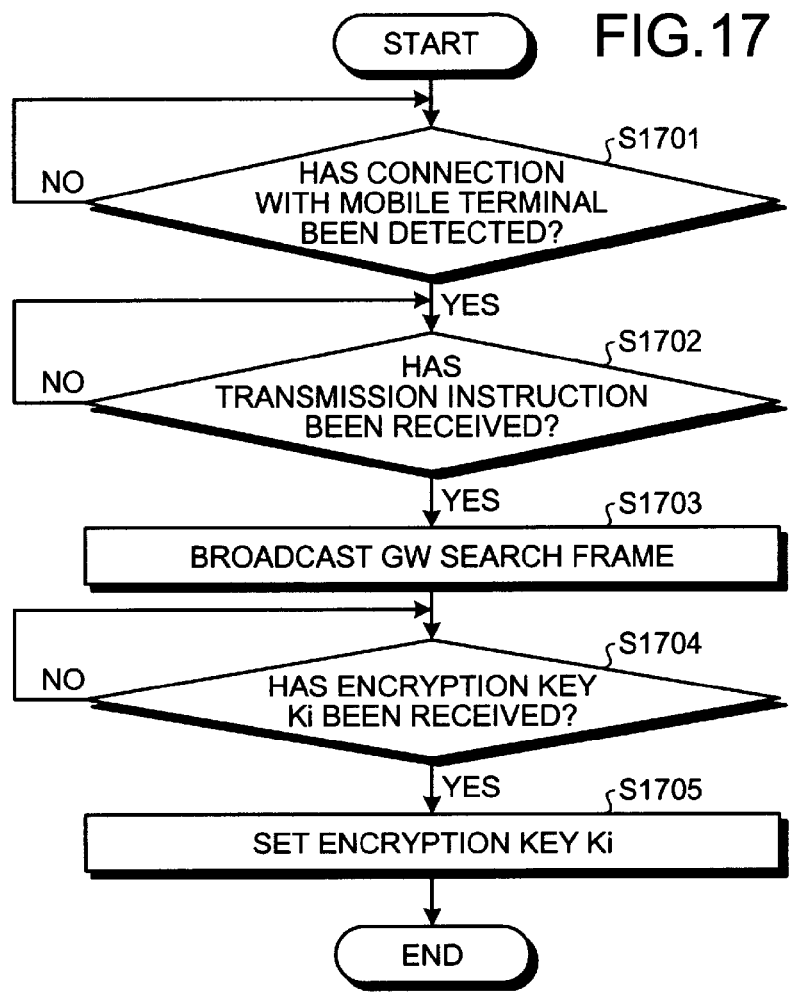
FIG. 17 is a flowchart of an example of a key setting process procedure of the node.

FIG. 17 is a flowchart of an example of a key setting process procedure of a node. In the flowchart of FIG. 17, first, it is determined whether the detecting unit 601 has detected connection with the mobile terminal 102 communicable with the management server 101 (step S1701).

Detection of connection with the mobile terminal 102 is awaited (step S1701: NO) and when connection is detected (step S1701: YES), it is determined whether the receiving unit 602 has received a transmission instruction for a GW search frame from the mobile terminal 102 (step S1702).

Reception of a transmission instruction for a GW search frame is awaited (step S1702: NO) and when a transmission instruction is received (step S1702: YES), the frame transmitting unit 603 broadcasts the GW search frame to the ad-hoc network Ai (step S1703).

It is determined whether the key receiving unit 604 has received from the mobile terminal 102, the encryption key Ki specific to the gateway Gi in the ad-hoc network Ai to which the node N belongs (step S1704).

Reception of the encryption key Ki specific to the gateway Gi is awaited (step S1704: NO) and when the encryption key Ki is received (step S1704: YES), the setting unit 605 sets the received encryption key Ki as a key for encrypting a packet (step S1705), and a series of the processes of this flowchart ends.

As a result, the encryption key Ki specific to the gateway Gi for encrypting packets transmitted and received between the nodes in the ad-hoc network Ai can be acquired and set from the management server 101, via a temporarily established communication path, by utilizing the mobile terminal 102.

Figure 18:
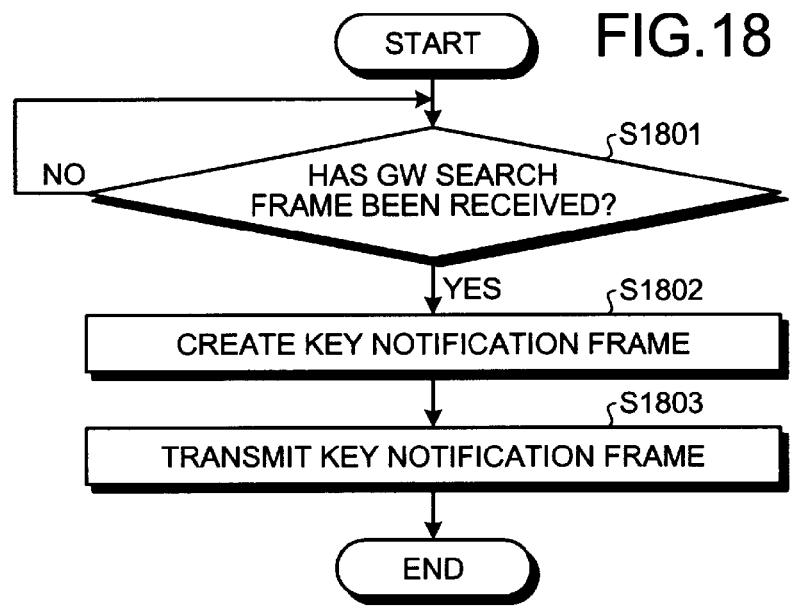
FIG. 18 is a flowchart of an example of a key notification process procedure of the gateway.

FIG. 18 is a flowchart of an example of a key notification process procedure of a gateway. In the flowchart of FIG. 18, first, it is determined whether the GW receiving unit 901 has received, via the ad-hoc network Ai, a GW search frame broadcasted from the node N (step S1801).

Reception of a GW search frame is awaited (step S1801: NO) and when a GW search frame is received (step S1801: YES), the creating unit 902 creates a key notification frame (the key notification frame 1000 or 1100) representative of a notification request for the encryption key Ki specific to the gateway Gi (step S1802).

The GW transmitting unit 903 transmits the created key notification frame, via the network NW1, to the management server 101 (step S1803), and a series of the processes of this flowchart ends.

As a result, the key notification frame representative of a notification request for the encryption key Ki specific to the gateway Gi can be transmitted to the management server 101 in response to the GW search frame from the node N in the ad-hoc network Ai.

A key providing process procedure of the management server 101 will be described. First, description will be made of the key providing process procedure when the management server 101 does not retain the encryption keys K1 to Kn specific to the gateways G1 to Gn. Therefore, the key providing process procedure of the following description is a process procedure when the encryption key Ki specific to the gateway Gi is included in the key notification frame transmitted from the gateway Gi to the management server 101.

Figure 19:
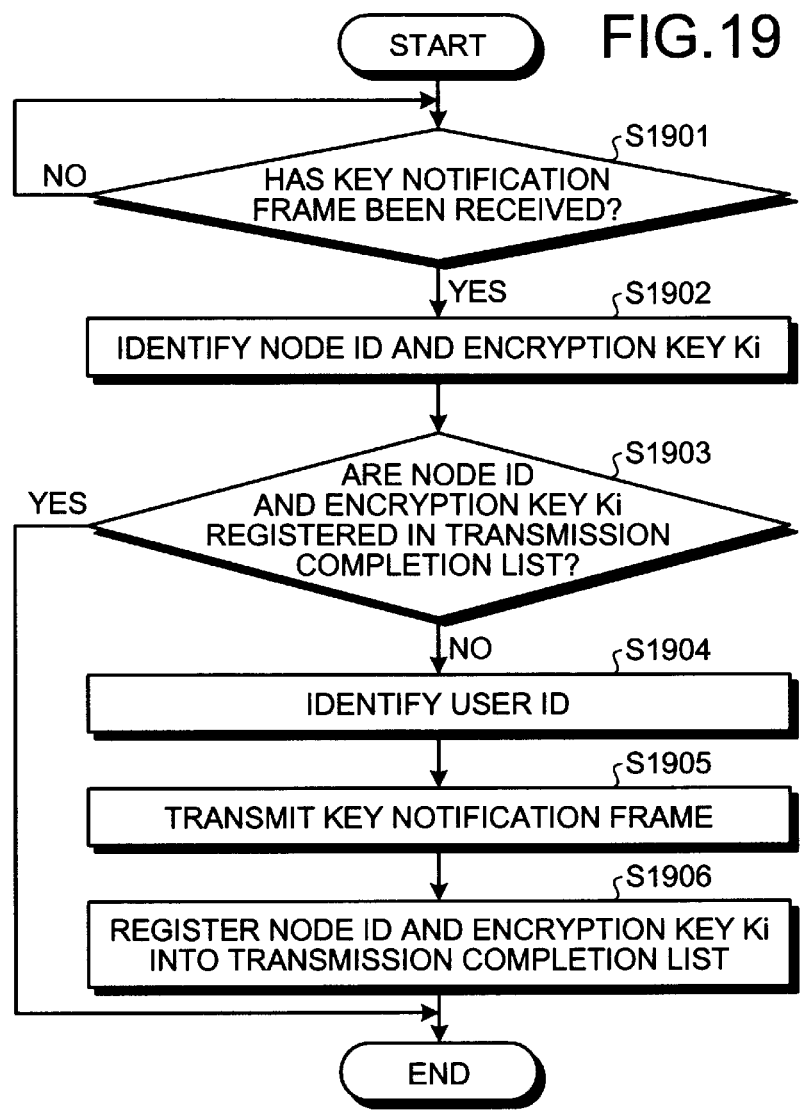
FIG. 19 is a flowchart (part 1) of an example of a key providing process procedure of the management server.

FIG. 19 is a flowchart (part 1) of an example of the key providing process procedure of the management server. In the flowchart of FIG. 19, first, it is determined whether the SV receiving unit 1201 has received the key notification frame, via the network NW1, from the gateway Gi (step S1901).

Reception of the key notification frame is awaited (step S1901: NO) and when the key notification frame is received (step S1901: YES), the determining unit 1203 identifies a node ID and an encryption key Ki included in the received key notification frame (step S1902). The determining unit 1203 determines whether the identified paired node ID and encryption key are registered in the transmission completion list 1300 (step S1903).

If the paired node ID and encryption key Ki are not registered in the transmission completion list 1300 (step S1903: NO), the SV transmitting unit 1202 identifies a user ID included in the received key notification frame (step S1904). The SV transmitting unit 1202 then transmits the received key notification frame, via the network NW2, to the mobile terminal 102 of the identified user ID (step S1905).

The determining unit 1203 correlates and registers the node ID and the encryption key Ki identified at step S1902 into the transmission completion list 1300 (step S1906), and a series of the processes of this flowchart ends. On the other hand, if the paired node ID and encryption key Ki are registered in the transmission completion list 1300 at step S1903 (step S1903: YES), a series of the processes of this flowchart ends.

As a result, the node N can be provided with the encryption key Ki specific to the gateway Gi in the ad-hoc network Ai to which the node N belongs, via a communication path temporarily established, by utilizing the mobile terminal 102.

Description will be made of the key providing process procedure when the management server 101 retains the encryption keys K1 to Kn specific to the gateways G1 to Gn. Therefore, the key providing process procedure of the following description is a process procedure when the encryption key Ki specific to the gateway Gi is not included in the key notification frame transmitted from the gateway Gi to the management server 101.

Figure 20:
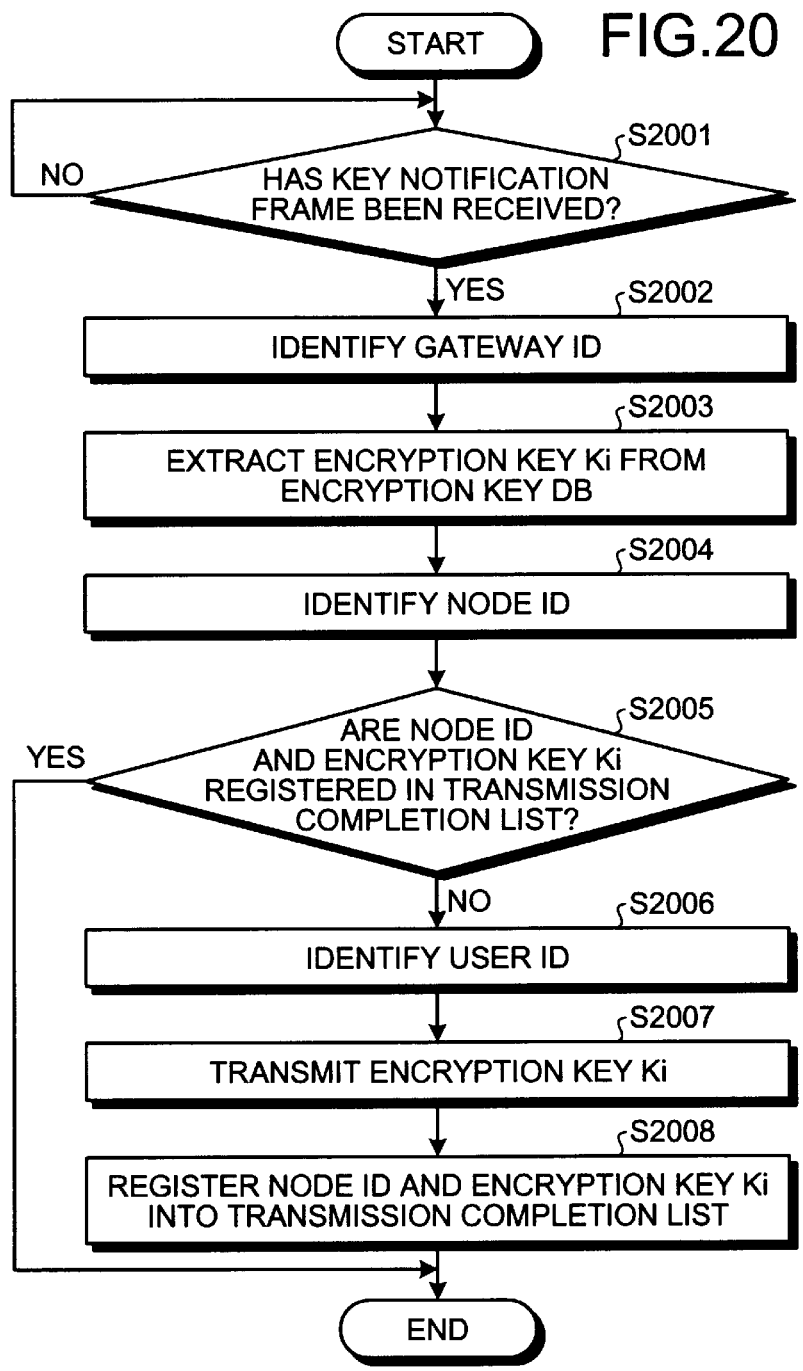
FIG. 20 is a flowchart (part 2) of an example of the key providing process procedure of the management server.

FIG. 20 is a flowchart (part 2) of an example of the key providing process procedure of the management server. In the flowchart of FIG. 20, first, it is determined whether the SV receiving unit 1201 has received the key notification frame, via the network NW1, from the gateway Gi (step S2001).

Reception of the key notification frame is awaited (step S2001: NO) and when the key notification frame is received (step S2001: YES), the extracting unit 1204 identifies the gateway ID included in the received key notification frame (step S2002). The extracting unit 1204 extracts from the encryption key DB 1400, an encryption key Ki stored and correlated with the identified gateway ID (step S2003).

The determining unit 1203 identifies the node ID included in the received key notification frame (step S2004). The determining unit 1203 determines whether the identified paired node ID and extracted encryption key are registered in the transmission completion list 1300 (step S2005).

If the paired node ID and encryption key Ki are not registered in the transmission completion list 1300 (step S2005: NO), the SV transmitting unit 1202 identifies the user ID included in the received key notification frame (step S2006). The SV transmitting unit 1202 then transmits the extracted encryption key, via the network NW2, to the mobile terminal 102 of the identified user ID (step S2007).

The determining unit 1203 correlates and registers the node ID identified at step S2004 and the encryption key Ki extracted at step S2003 into the transmission completion list 1300 (step S2008), and a series of the processes of this flowchart ends.

On the other hand, if the paired node ID and encryption key Ki are registered in the transmission completion list 1300 at step S2005 (step S2005: YES), a series of the processes of this flowchart ends. As a result, as compared to a case of receiving from the gateway Gi, a key notification frame that includes the encryption key Ki, the data amount at the time of communication with the gateway Gi can be reduced.

As described, the node N according to this embodiment can establish a temporary communication path, via the mobile terminal 102 of the operator OP, to the management server 101. The node N can broadcast the GW search frame to the ad-hoc network Ai in response to the connection with the mobile terminal 102. The node N can receive, via the mobile terminal 102, the encryption key Ki transmitted from the gateway Gi to the management server 101, as a result of transfer of the GW search frame to the gateway Gi.

Therefore, at the time of the key setting at the node N, the encryption key Ki to be set in the node N can be acquired easily and the efficiency of setting the encryption key Ki used by the node N can be increased. For example, when the node N is initially introduced, the operator OP does not have to perform work such as thoroughly confirming communication statuses between geographically narrowed-down candidate gateways and the node N, and the efficiency in setting the encryption key Ki for the node N can be increased. Since it is not necessary to record the encryption keys of the candidate gateways in the mobile terminal 102, etc. for the confirming operation, the risk of information leaks can be reduced when the mobile terminal 102 is transported.

The node N according to the embodiment can broadcast the GW search frame to the ad-hoc network Ai in response to a transmission instruction for the GW search frame from the mobile terminal 102. As a result, when a setting operation different from the key setting is performed with respect to the node N by utilizing the mobile terminal 102, the node N can be prevented from broadcasting the GW search frame at the time of detection of the connection with the mobile terminal 102.

The node N according to this embodiment can broadcast a GW search frame that includes the identifier of the mobile terminal 102 to the ad-hoc network Ai. As a result, if the mobile terminals 102 are connected in a communicable manner, the management server 101 can properly distinguish the mobile terminal 102 that is the transmission destination of the key notification frame.

The node N according to this embodiment can broadcast a GW search frame that includes the identifier of the node N to the ad-hoc network Ai. As a result, the management server 101 can manage the nodes N for which the key notification frame has been transmitted to prevent the redundant transmission of the key notification frame.

As described, the key setting method, the node, and the network system can achieve a reduction in workload and a shortening of work hours of operators involved with the setting of encryption keys for nodes in ad-hoc networks.

The key setting method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

The key setting method, the node, and the network system effect improved efficiency in the setting of an encryption key used by the nodes in the ad-hoc network.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A key setting method executed by a node that transmits and receives data through multi-hop communication in an ad-hoc network among a plurality of ad-hoc networks, the key setting method comprising:
   detecting connection with a mobile terminal communicating with a server connected to a gateway in each ad-hoc network among the ad-hoc networks;
   transmitting by simultaneously reporting to the ad-hoc network, an acquisition request for a key for encrypting the data when the connection with the mobile terminal is detected at the detecting;
   receiving from the server via the mobile terminal, a key specific to a gateway and transmitted from the gateway to the server consequent to transfer of the simultaneously reported acquisition request to the gateway in the ad-hoc network; and
   setting the key specific to the gateway received at the receiving as the key for encrypting the data.

2. The key setting method according to claim 1, further comprising receiving a transmission instruction for an acquisition request for a key for encrypting the data from the mobile terminal for which connection is detected at the detecting step, wherein
   the transmitting includes simultaneously reporting the acquisition request to the ad-hoc network, when the transmission instruction is received at the receiving.

3. The key setting method according to claim 2, wherein
   the transmitting includes simultaneously reporting to the ad-hoc network, the acquisition request including an identifier of the mobile terminal, by which the server identifies a communication destination included in the transmission instruction.

4. The key setting method according to claim 2, wherein
   the transmitting includes simultaneously reporting to the ad-hoc network, the acquisition request including an identifier of the node by which the server identifies the node for which the key specific to the gateway has been transmitted.

5. The key setting method according to claim 1, further comprising transferring by simultaneously reporting the acquisition request to the ad-hoc network, when the acquisition request is received from another node different from the node in the ad-hoc network.

6. A node that transmits and receives data through multi-hop communication in an ad-hoc network among a plurality of ad-hoc networks, the node comprising a processor;
   the processor configured to:
   detect connection with a mobile terminal communicating with a server connected to a gateway in each ad-hoc network among the ad-hoc networks;
   transmit by simultaneously reporting to the ad-hoc network, an acquisition request for a key for encrypting the data upon detection of the connection with the mobile terminal;
   receive from the server via the mobile terminal, the key specific to a gateway and transmitted from the gateway to the server consequent to transfer of the simultaneously reported acquisition request to the gateway in the ad-hoc network; and
   set the received key specific to the gateway as the key for encrypting the data.

7. The node according to claim 6, wherein
   the receiver configured to receive a transmission instruction for an acquisition request for a key for encrypting the data from the mobile terminal for which connection is detected,
   the transmitter simultaneously reports the acquisition request to the ad-hoc network, upon receipt of the transmission instruction.

8. The node according to claim 6, wherein
   the transmitter simultaneously reports to the ad-hoc network, the acquisition request including an identifier of the mobile terminal, by which the server identifies a communication destination included in the transmission instruction.

9. The node according to claim 7, wherein
   the transmitter simultaneously reports to the ad-hoc network, the acquisition request including an identifier of the node by which the server identifies the node for which the key specific to the gateway has been transmitted.

10. The node according to claim 8, wherein
    the transmitter simultaneously reports to the ad-hoc network, the acquisition request including an identifier of the node by which the server identifies the node for which the key specific to the gateway has been transmitted.

11. The node according to claim 6, wherein
    the transmitter is configured to transfer by simultaneously reporting the acquisition request to the ad-hoc network, upon receipt of the acquisition request from another node different from the node in the ad-hoc network.

12. A network system comprising:
    a node that transmits and receives a packet through multi-hop communication in an ad-hoc network among a plurality of ad-hoc networks, the node comprising a first processor; and
    a server connected to a gateway in each ad-hoc network of the ad-hoc networks, the server comprising a second processor, wherein
    the first processor is configured to:
    detect connection with a mobile terminal capable of communicating with the server,
    transmit by simultaneously reporting to the ad-hoc network upon detecting the connection with the mobile terminal, an acquisition request for a key for encrypting the data,
    receive from the server via the mobile terminal, the key specific to a gateway and transmitted from the gateway to the server consequent to transfer of the simultaneously reported acquisition request to the gateway in the ad-hoc network, and
    set the received key specific to the gateway as the key for encrypting the data, and wherein
    the second processor is configured to:
    receive the key specific to the gateway from the gateway in the ad-hoc network to which the acquisition request is transferred, and
    transmit to the node, via the mobile terminal, the received key specific to the gateway.

* * * * *